C. L. ANDERSEN & L. M. KNIFFIN.
SPRING WHEEL.
APPLICATION FILED AUG. 13, 1914.
1,127,154.
Patented Feb. 2, 1915.
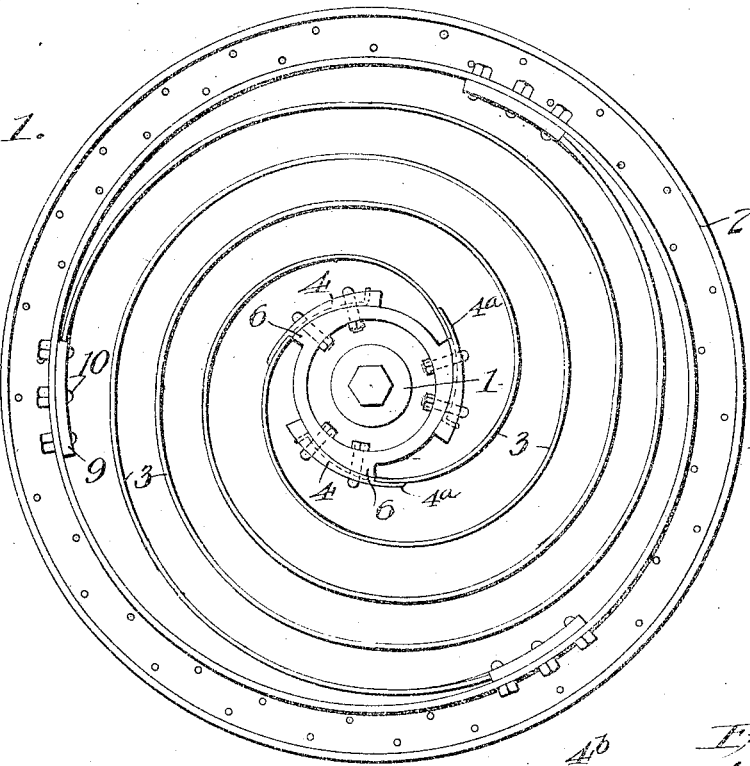
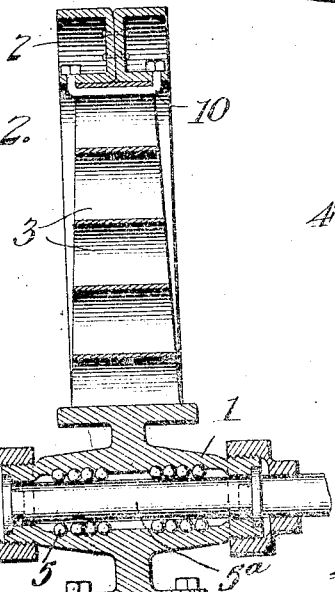
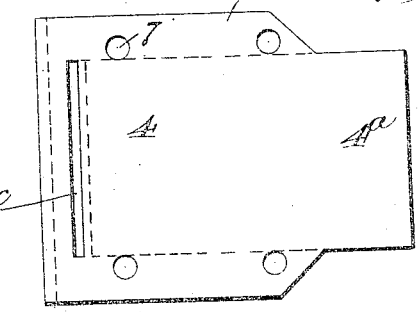
Inventors
Charles L. Andersen
Lloyd M. Kniffin

UNITED STATES PATENT OFFICE.

CHARLES L. ANDERSEN, OF EAST CHICAGO, AND LLOYD M. KNIFFIN, OF HAMMOND, INDIANA.

SPRING-WHEEL.

1,127,154.

Specification of Letters Patent.

Patented Feb. 2, 1915.

Application filed August 18, 1914. Serial No. 250,604.

*To all whom it may concern:*

Be it known that we, CHARLES L. ANDERSEN and LLOYD M. KNIFFIN, both citizens of the United States, and residing in East Chicago, Lake county, Indiana, and Hammond, county of Lake, Indiana, respectively, have invented certain new and useful Improvements in Spring-Wheels, of which the following is a specification.

This invention relates to a spring wheel and especially to vehicle wheels for automobiles and the like and especially to that type of wheel in which the load on the hub is transmitted to the rim by means of spiral springs.

The object of the present invention is to secure sufficient resiliency to make unnecessary the use of pneumatic tires, at the same time to provide a strong and durable construction, and one in which any broken part may be quickly removed for repairing or replacing.

The invention consists of the novel features of construction hereinafter described, pointed out in the claim and shown in the accompanying drawings, in which:

Figure 1 is a side elevation. Fig. 2 is a radial section. Fig. 3 is a plan view of a securing plate. Fig. 4 is a longitudinal section taken centrally through said plate. Fig. 5 is a transverse section through the plate shown in Fig. 3.

In these drawings 1 represents a hub and 2 a rim. Spiral springs 3 are detachably secured at their inner and outer ends to the hub and rim respectively, and at their inner ends are secured to the hub by means of securing plates 4.

The parts above named are the essential portions of the invention and each of said parts has a particular construction which adapts it for its special purpose. The interior of the hub is shaped to receive any desired type of ball bearings as indicated at 5 and also receives the axle spindle 5ª. Upon the exterior the hub is machined so as to provide preferably three cam surfaces 6, the curvature of said surfaces being that at which the spiral springs are designed to leave the hub. As the spring is weakened by forming bolt openings therein the inner ends of the springs are not cut out or perforated to lie flat upon said cam faces. Fitting over said springs and cam faces are the longitudinally curved securing plates 4. These plates project slightly beyond the cam surfaces 6, said projecting portion 4ª having a width equal to that of the springs and reinforcing them where they leave the cam surfaces while the remaining portion has a slightly greater width and is flanged or thickened upon each side as indicated at 4ᵇ so that when the plate is secured in position upon the cam-like surface 6 with the flanges 4ᵇ bearing thereupon a sleeve is formed which receives the inner end of one of the springs 3. To prevent withdrawal of the springs from the sleeve or space between the plates 4 and surface 6 the extreme inner end of the spring is bent at a right angle and extends into a transverse slot 4ᶜ formed in the plate 4. The flanges or thickened marginal portions 4ᵇ are perforated as shown at 7 to register with suitable perforations formed in the hub flange and suitable U-bolts 8 passed through the perforations 7 and through the hub flange, which carries the surfaces 6, thereby firmly securing plate 4 into position. The angled inner end of the spring prevents longitudinal movement of the spring with respect to the plate 4 while said plate is locked to the hub.

After the springs leave the hub they make more than one complete turn about the hub before reaching the rim, and as will be noted from Fig. 1 the three springs are practically concentric, or parallel to each other.

The rim is preferably formed of two channel irons which are placed back to back and riveted together, as shown most clearly in Fig. 2. As shown in Fig. 1 the outer ends of the springs are secured to said rim by means of plates 9 and U-bolts 10, the plates 9 being substantially similar to the plates 4. But as shown in Fig. 2 the plates 9 may be omitted if desired and the U-bolts 10 may bear directly upon the outer end portions of the springs. It is preferable, however, to employ the bolts 10 although not absolutely necessary, and no change in construction is involved in simply omitting them. Any suitable form of nuts may be employed in connection with the U-bolts and any means may be employed for locking said nuts.

What we claim is:—

In a wheel, a hub having cam surfaces formed thereon, a rim, spiral springs having one end secured to the rim and having their inner ends bearing on said cam surfaces, and bent at an angle to said surfaces, and longitudinally curved securing plates bearing on said cam surfaces and extending beyond
5 them and bearing against said springs, said plates being recessed to receive the inner end portions of the springs, and being transversely slotted to receive the angled portions.

CHARLES L. ANDERSEN.
LLOYD M. KNIFFIN.

Witnesses:
E. KENNETT KIMPTON,
JOS. F. BEATTIE.